United States Patent
Velde et al.

(10) Patent No.: US 9,509,594 B2
(45) Date of Patent: Nov. 29, 2016

(54) MOBILE TERMINAL PREPARATION

(71) Applicant: Samsung Electronics Co., Ltd., Suwon-si, Gyeonggi-do (KR)

(72) Inventors: Himke Van Der Velde, Zwolle (NL); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 14/063,505

(22) Filed: Oct. 25, 2013

(65) Prior Publication Data
US 2014/0119175 A1 May 1, 2014

(30) Foreign Application Priority Data
Oct. 25, 2012 (GB) .................................. 1219174.8

(51) Int. Cl.
H04L 12/703 (2013.01)
H04W 76/02 (2009.01)

(52) U.S. Cl.
CPC ............ H04L 45/28 (2013.01); H04W 76/028 (2013.01)

(58) Field of Classification Search
CPC ....... H04L 45/28; H04L 45/22; H04L 45/00; H04L 29/14; H04L 12/2422
USPC ................................................ 370/225–228
See application file for complete search history.

(56) References Cited

U.S. PATENT DOCUMENTS

| | | | |
|---|---|---|---|
| 8,711,709 B2 * | 4/2014 | Marinier | H04W 72/02 370/242 |
| 8,787,212 B2 * | 7/2014 | Oprescu-Surcobe | H04W 72/005 370/261 |
| 8,811,159 B2 * | 8/2014 | Lee | H04W 76/028 370/225 |
| 8,817,600 B2 * | 8/2014 | Payyappilly | H04W 36/0066 370/225 |
| 8,868,080 B2 * | 10/2014 | Wang | H04W 36/08 370/331 |
| 8,880,073 B2 * | 11/2014 | Vikberg | H04W 36/0022 370/331 |
| 8,908,504 B2 * | 12/2014 | Barbieri | H04W 36/06 370/225 |
| 8,929,202 B2 * | 1/2015 | Wahlqvist | H04W 76/028 370/225 |
| 8,982,693 B2 * | 3/2015 | Krishnamurthy | H04W 52/50 370/216 |
| 9,055,503 B2 * | 6/2015 | Lee | H04W 36/30 |
| 9,066,253 B2 * | 6/2015 | Schmidt | H04W 24/04 |
| 9,178,758 B2 * | 11/2015 | Chen | H04L 41/0681 |
| 2007/0021122 A1 | 1/2007 | Lane et al. | |
| 2008/0293398 A1 * | 11/2008 | Seyama et al. | 455/422.1 |
| 2009/0004971 A1 * | 1/2009 | Dateki et al. | 455/62 |
| 2010/0165836 A1 * | 7/2010 | Wahlqvist | H04W 76/028 370/225 |
| 2010/0255807 A1 * | 10/2010 | Umatt | H04W 4/22 455/404.1 |

(Continued)

FOREIGN PATENT DOCUMENTS

KR 10-2011-0134475 A 12/2011
WO 2009-064716 A1 5/2009

(Continued)

Primary Examiner — Mark Rinehart
Assistant Examiner — Sanjay K Dewan
(74) Attorney, Agent, or Firm — Jefferson IP Law, LLP

(57) ABSTRACT

A method of operating a mobile terminal in a wireless communications network is provided. The method includes connecting with a serving cell to establish a radio link enabling the transmission of data via the serving cell, receiving signaling data associated with the serving cell, the signaling data being configured to prepare the mobile terminal for the re-establishment of a connection of the mobile terminal to a different cell in the event of radio link failure on the serving cell, and processing the signaling data in order to store fallback data which is to be used in the event of radio link failure on the serving cell.

20 Claims, 7 Drawing Sheets

(56) References Cited

U.S. PATENT DOCUMENTS

| | | | |
|---|---|---|---|
| 2010/0330993 A1 | 12/2010 | Kone | |
| 2011/0021154 A1 | 1/2011 | Marinier et al. | |
| 2011/0039546 A1* | 2/2011 | Narasimha et al. | 455/423 |
| 2011/0081904 A1 | 4/2011 | Kuo | |
| 2011/0124340 A1* | 5/2011 | Puttonen | H04W 36/0083 455/437 |
| 2011/0159880 A1* | 6/2011 | Kumar et al. | 455/450 |
| 2011/0176430 A1* | 7/2011 | Zetterberg et al. | 370/242 |
| 2011/0183662 A1* | 7/2011 | Lee | H04W 24/10 455/422.1 |
| 2011/0207485 A1* | 8/2011 | Dimou | H04W 36/0055 455/507 |
| 2011/0242970 A1* | 10/2011 | Prakash et al. | 370/225 |
| 2012/0202557 A1* | 8/2012 | Olofsson | H04W 24/08 455/525 |
| 2013/0003533 A1* | 1/2013 | Barbieri et al. | 370/225 |
| 2013/0028069 A1* | 1/2013 | Pelletier | H04W 72/0453 370/216 |
| 2013/0035101 A1* | 2/2013 | Wang | H04W 36/08 455/437 |
| 2013/0182555 A1* | 7/2013 | Raaf | H04W 36/0033 370/216 |
| 2013/0223205 A1* | 8/2013 | Chuang | 370/225 |
| 2013/0223409 A1* | 8/2013 | Jung et al. | 370/331 |
| 2013/0260745 A1* | 10/2013 | Johansson et al. | 455/423 |
| 2013/0295939 A1* | 11/2013 | Wegmann | H04W 76/028 455/436 |
| 2013/0308443 A1* | 11/2013 | Uemura et al. | 370/225 |
| 2013/0315075 A1* | 11/2013 | Tamura et al. | 370/242 |
| 2014/0078885 A1 | 3/2014 | Koskinen et al. | |
| 2014/0113647 A1* | 4/2014 | Shen et al. | 455/452.1 |
| 2014/0120921 A1 | 5/2014 | Keskitalo et al. | |
| 2014/0133465 A1* | 5/2014 | Johansson et al. | 370/332 |
| 2014/0307542 A1* | 10/2014 | Fujishiro | 370/225 |
| 2014/0328318 A1* | 11/2014 | Sundararajan et al. | 370/331 |
| 2014/0335872 A1* | 11/2014 | Yamada | H04W 76/028 455/450 |
| 2015/0009802 A1* | 1/2015 | Wager et al. | 370/218 |
| 2015/0045035 A1* | 2/2015 | Nigam et al. | 455/436 |

FOREIGN PATENT DOCUMENTS

| | | |
|---|---|---|
| WO | 2011/022148 A1 | 2/2011 |
| WO | 2011/102774 A1 | 8/2011 |
| WO | 2011/133079 A1 | 10/2011 |
| WO | 2012-019363 A1 | 2/2012 |
| WO | 2012/160246 A1 | 11/2012 |
| WO | 2012/176010 A2 | 12/2012 |

* cited by examiner

MOBILE TERMINAL PREPARATION

CROSS-REFERENCE TO RELATED APPLICATION(S)

This application claims the benefit under 35 U.S.C. §119(a) of a Korean patent application filed on Oct. 25, 2012 in the Great Britain Intellectual Property Office and assigned Serial No. 1219174.8, the entire disclosure of which is hereby incorporated by reference.

TECHNICAL FIELD

The present disclosure relates generally to wireless networks. More specifically, the present invention relates to preparing a mobile terminal for a possible radio link failure.

BACKGROUND OF THE INVENTION

Wireless mobile networks, in which a User Equipment (UE), such as a mobile handset, communicates via a radio link to a network of base stations or other wireless access points connected to a telecommunications network, have recently undergone rapid development through a number of successive generations. The initial deployment of systems using analog signaling has been superseded by second Generation (2G) digital systems such as Global System for Mobile communications (GSM), which typically use a radio access technology known as GSM Enhanced Data rates for GSM Evolution Radio Access (GERA), combined with an improved core network.

The second generation systems have themselves been replaced by or augmented by third Generation (3G) digital systems such as Universal Mobile Telecommunications System (UMTS), using the Universal Terrestrial Radio Access (UTRA) radio access technology and a similar core network to GSM. Third generation standards provide for a greater throughput of data than is provided by second generation systems, and this trend is continuing in view of the proposals by the Third Generation Partnership Project (3GPP) of a new 4G system known as the Evolved Packet System (EPS), but which is more commonly referred to as the Long Term Evolution (LTE) system. LTE systems use an improved radio access technology known as Evolved UTRA (E-UTRA), which offers potentially greater capacity and additional features when compared with the previous standards, combined with an improved core network technology referred to as the Evolved Packet Core (EPC).

As in earlier wireless mobile standards, LTE is designed as a cellular system in which base stations, known as eNBs, provide coverage over one or more cells. In general, a mobile terminal in LTE, known as the User Equipment (UE), communicates with one base station and one cell at a time. The mobile terminal can exist in one of two communication states in LTE: an IDLE state in which the mobile terminal is basically on standby, and a CONNECTED state in which the mobile terminal has an active radio link to the base station.

In the IDLE state in LTE, the mobile terminal is tracked by the network to a specific tracking area, which may cover several base stations. The mobile terminal is not assigned to any particular base station, but may itself choose which base station or base stations it listens to. The main aim in this state is to minimize signaling and the consumption of resources, and thereby maximize standby time for terminals with limited battery power.

In contrast, in the CONNECTED state in LTE, the mobile terminal has a serving base station allocated to it, has its location tracked to the serving base station, and has active bearers which allow the terminal to transmit and receive at relatively high data rates.

If a failure occurs in the CONNECTED state, the terminal can lose its allocation to a serving base station. In this situation, there is a risk that the terminal may revert to the IDLE state along with an associated disruption to the data connections, including potential data loss. This disruption of the connection to the serving base station may be the result of a Radio Link Failure (RLF).

In an attempt to prevent the transition to an IDLE state, the UE may try to perform a connection re-establishment. If the connection re-establishment succeeds, the UE remains in CONNECTED and data loss may be prevented.

In the current LTE system, a User Equipment (UE) experiencing a Radio Link Failure (RLF) may have to execute certain steps before being able to access a cell in order to re-establish a connection. These steps may include performing a cell search and reading required system information.

Therefore, a need exists for a method and apparatus for preparing a mobile terminal for a possible radio link failure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of operating a mobile terminal in a wireless communications network. The method comprises connecting with a serving cell to establish a radio link enabling the transmission of data via the serving cell, receiving signaling data associated with the serving cell, the signaling data being configured to prepare the mobile terminal for the re-establishment of a connection of the mobile terminal to a different cell in the event of radio link failure on the serving cell, and processing the signaling data in order to store fallback data which is to be used in the event of radio link failure on the serving cell.

This has the advantage that the mobile terminal can be prepared for a radio link failure before it occurs by setting up fallback data to be used in the event of a radio link failure. This in turn improves the chances of there being minimal delay between such a radio link failure and the mobile terminal initiating re-establishment of a connection with a different cell. By means of signaling data, the network is able to take network configuration and deployment situations into account, and influence how the fallback data is setup.

In an embodiment, the method further comprises, in the event of radio link failure on the serving cell, using the fallback data to select a cell to attempt to re-establish a connection.

In an embodiment of the present disclosure, the fallback data identifies a fallback cell and in the event of radio link failure on the serving cell, attempting to re-establish a connection to the identified fallback cell.

This has an advantage in that since the fallback cell is identified before the radio link failure occurs, the cell can more easily be found if the radio link failure occurs.

In an embodiment, the fallback data identifies if the fallback cell is synchronized to the serving cell. Knowing that the fallback cell is synchronized to the serving cell has an advantage in that cell search performance can be improved if the timing information from the serving cell can be applied to the fallback cell.

In an embodiment of the present disclosure, the method may further comprise attempting to re-establish a connection to the identified fallback cell before attempting to re-establish a connection to any other cell.

This has an advantage in that the fallback cell may be a cell with a greater possibility of being found quicker than other cells, so that unnecessary delays associated with the other cells can be avoided.

In an embodiment of the present disclosure, the method further comprises, in the event of failure to re-establish a connection to the identified fallback cell, attempting to re-establish a connection to another cell which is not identified in the fallback data.

This has an advantage that a connection re-establishment can still occur even if a connection re-establishment with the fallback cell does not work.

In an embodiment of the present disclosure, the failure to re-establish a connection is determined as an expiration of a determined time period before a re-establishment.

This has an advantage that the time period can be chosen so that there still can be time to connect with another cell if a connection with a fallback cell does not happen quickly enough.

In an embodiment of the present disclosure, the failure to re-establish a connection is determined based on a quality measurement of the identified fallback cell.

In an embodiment of the present disclosure, the fallback data identifies a fallback frequency and, in the event of radio link failure on the serving cell, attempting to re-establish a connection to a cell using the fallback frequency.

This has an advantage in that the fallback frequency may be a frequency in which the network is more likely to have cells available.

In an embodiment of the present disclosure, the method further comprises attempting to re-establish a connection to a cell using the fallback frequency before attempting to re-establish a connection to a cell using any other frequency.

This has an advantage in that the mobile terminal is less likely to waste time searching for cells on an unsuitable frequency.

In an embodiment of the present disclosure, the method further comprising, in the event of failure to re-establish a connection to a cell using the fallback frequency, attempting to re-establish a connection to another cell using another frequency.

This has an advantage in that the mobile terminal can nevertheless attempt to find cells on alternative frequencies if not successful with the fallback frequency.

In an embodiment of the present disclosure, the failure to re-establish a connection is determined as an expiration of a determined time period before a re-establishment.

This has an advantage in that the time period can be chosen so that there still can be time to connect with another cell if a connection with a fallback cell does not happen quickly enough.

In an embodiment of the present disclosure, the failure to re-establish a connection is determined based on a quality measurement of the fallback cell.

This has an advantage in that the re-establishment procedure can be stopped at an early stage if the quality of the fallback cell does not satisfy certain quality criteria. Thus, unnecessary delays associated with trying to re-establish with unsuitable cells are avoided.

In an embodiment of the present disclosure, the method further comprises, in the event of failure to re-establish a connection to the network, reverting to an idle mode and establishing a new connection to the network using the fallback data.

This has an advantage in that the fallback data can still be used in the situation where the mobile terminal has had to revert to an idle mode.

In an embodiment, signaling data includes the fallback data.

This has an advantage that the network can specify what fallback cell or fallback frequency should be used by the mobile terminal in the event of a radio link failure. This allows the network to avoid wasting time while the mobile terminal searches for cells or searches frequencies that the network is aware are unlikely to result in successful connection re-establishments.

In an embodiment of the present disclosure, the signaling data identifies a plurality of fallback cells to the mobile terminal to prepare for the possible event of radio link failure on the serving cell, and wherein the fallback data is stored as a result of the mobile terminal selecting one of the plurality of cells. The signaling data may identify a preferred order for selection of the plurality of fallback cells.

In an embodiment of the present disclosure, the signaling data comprises an indication to the mobile terminal to prepare for the possible event of radio link failure on the serving cell, and wherein the fallback data is stored as a result of preparations made by the mobile terminal in response to the indication.

This has an advantage in that the mobile terminal can be signaled to prepare itself for a possible radio link failure. This in turn enables the network to warn the mobile terminal in situations where it believes a radio link failure is more likely.

In an embodiment of the present disclosure, the method further comprises searching for a suitable fallback cell in response to the indication. The mobile terminal can search for the fallback cell on a frequency other than the frequency of the serving cell. This may be termed an inter-frequency search.

In an embodiment of the present disclosure, the signaling data identifies a fallback frequency to the mobile terminal to prepare for the possible event of radio link failure on the serving cell, and wherein the fallback data is stored as a result of the mobile terminal searching for a cell using the fallback frequency.

This has an advantage in that the mobile terminal can prepare a specific cell using the fallback frequency identified by the network.

In an embodiment of the present disclosure, the signaling data identifies if one or more cells in the fallback frequency are synchronized to the serving cell.

This has an advantage in that information available in the network about synchronization of timings between cells can be made available to the mobile terminal to assist with finding those cells quicker in the event of a radio link failure.

In an embodiment, the method comprises receiving the signaling data from the serving cell after the establishment of the radio link with the serving cell.

In an embodiment of the present disclosure, the method further comprises updating the fallback data using signaling data from a cell other than the serving cell.

This has an advantage in that the fallback data can be kept up to date which increases the chances that another cell can be found or accessed quickly.

In an embodiment of the present disclosure, the method further comprises measuring signaling data from a cell other than the serving cell on a frequency different from the serving cell frequency.

In an embodiment of the present disclosure, the mobile terminal autonomously interrupts reception or transmission on the serving cell to perform the measurements.

This has an advantage in that the mobile terminal has the freedom to make measurements outside of the serving cell to help keep the fallback data in the terminal up to date.

In an embodiment of the present disclosure, the interruption is limited by a maximum loss rate that may occur in the serving cells due to the mobile terminal being absent from the serving cell.

This has an advantage in that the interruptions on the serving cell are less likely to result in service interruptions experienced by the user.

In an embodiment of the present disclosure, the maximum loss rate is dependent on a determined condition on the serving cell.

For example, the loss rate may be allowed to increase when the serving cell quality goes below a threshold value since this may be when there is a heightened risk of a radio link failure.

In an embodiment of the present disclosure, the fallback data includes timing data for a fallback cell.

This has an advantage in that the mobile terminal can avoid wasting time reading and processing timing data broadcast from the fallback cell once it has been found.

In an embodiment of the present disclosure, the method further wherein the fallback data includes system information data for a fallback cell.

This has an advantage in that the mobile terminal can avoid wasting time reading and processing system information data broadcast from the fallback cell once it has been found.

In an embodiment of the present disclosure, the method further comprises, in the event of a radio link failure on the serving cell, using the fallback data to assist with re-establishing a connection to a cell selected by the mobile terminal.

This has an advantage in that the fallback data can include, for example, system information data for one or more cells neighboring the serving cell, and if the mobile terminal selects one of these neighboring cells then it does not have to waste time reading and processing the system information data for that cell. Hence, there can be less delay before a re-establishment message is sent to the selected cell. Accordingly, in an embodiment of the invention, the fallback data may comprise system information data for a cell selected by the mobile terminal.

In an embodiment of the present disclosure, the signaling data identifies one or more cells that are synchronized to the serving cell. The synchronization may comprise one or more of subframe timing synchronization, radio frame timing synchronization, and system frame number timing synchronization.

This has an advantage in that information available in the network about synchronization of timings between cells can be made available to the mobile terminal to assist with finding those cells quicker in the event of a radio link failure.

In accordance with another aspect of the present disclosure, a method of operating a base station in a wireless communications network is provided. The method includes connecting with a mobile terminal to establish a radio link, the radio link having configuration information associated therewith, and transmitting the configuration information to a potential target base station to prepare the target base station for re-establishment of the mobile terminal to the target base station in the event of radio link failure on the serving cell.

This has an advantage in that the potential target base station can be prepared specifically for a re-establishment of a mobile terminal. Accordingly, the target base station can be prepared for the re-establishment by having suitable configuration information available in the event that a mobile terminal experiences a radio link failure, but can avoid unnecessary resource reservation since it is not certain that the radio link failure will occur.

In an embodiment of the present disclosure, the transmission of configuration information to the potential target base station includes an indication that the target base station is not required to reserve connection resources for the mobile terminal.

In accordance with another aspect of the present disclosure, a method of operating a base station in a wireless communications network is provided. The method includes configuring a serving cell for use by at least one mobile terminal, receiving information on the synchronization of signal timings in a neighboring cell with signal timings in the serving cell, and transmitting the synchronization information to at least one of the mobile terminals to prepare the mobile terminal for receiving signals from the neighboring cell.

This has an advantage in that information available in the network about synchronization of timings between cells can be made available to the mobile terminal to assist with finding those cells quicker in the event of a radio link failure.

In an embodiment of the present disclosure, the synchronization information identifies another cell as being synchronized to the serving cell. The synchronization information may comprise one or more selected from among subframe timing synchronization, radio frame timing synchronization, and system frame number timing synchronization.

In accordance with another aspect of the present disclosure, a mobile terminal for use in a wireless communications network is provided. The terminal includes a radio interface configured to connect to a serving cell to establish a radio link enabling the transmission of data via the serving cell, and to receive signaling data associated with the serving cell, and a data processor configured to recognize the signaling data as signaling data to prepare the mobile terminal for re-establishing a connection of the mobile terminal to a different cell in the event of radio link failure on the serving cell, and to process the signaling data in order to store fallback data which is to be used in the event of radio link failure on the serving cell.

In accordance with another aspect of the present disclosure, a base station for use in a wireless communications network is provided. The base station being configured to establish a radio link with a mobile terminal enabling the transmission of data via the base station as a serving cell for the mobile terminal, transmit signaling data to the mobile terminal, and process the signaling data in order to store fallback data which is to be used in the event of radio link failure on the serving cell, wherein the signaling data comprises signaling data to prepare the mobile terminal for re-establishing a connection of the mobile terminal to a different cell in the event of radio link failure on the serving cell, to enable the mobile terminal to process the signaling data in order to store fallback data which is to be used in the event of radio link failure on the serving cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By way of example, embodiments of the present disclosure will now be described in the context of an Long Term Evolution (LTE) cellular wireless communications system operating in accordance with Release-10 and beyond of the LTE system standards. However, it will be understood that embodiments described herein are examples only, and that other embodiments may involve other wireless systems, operating to other releases and other standards.

Figure 1:
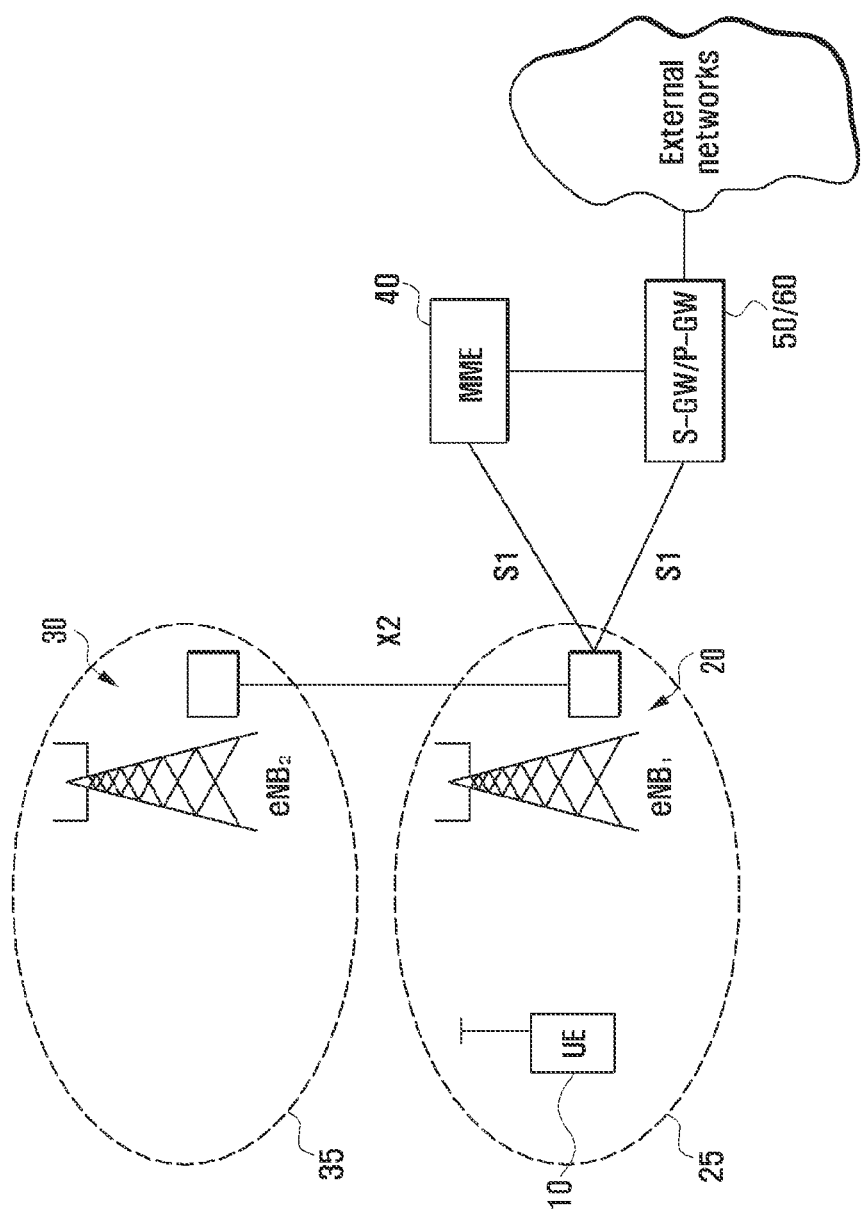
FIG. 1 is a schematic diagram illustrating a Long Term Evolution (LTE) system according to the related art.

An LTE cellular wireless communications system is illustrated schematically in FIG. 1.

FIG. 1 is a schematic diagram illustrating an LTE system according to the related art.

Referring to FIG. 1, the LTE system comprises a core network, a radio access network, one or more mobile terminals, and ideally an interface to external networks such as the internet or private corporate networks. The radio access network is known as the Evolved UMTS Terrestrial Radio Access Network (E-UTRAN) in LTE, and handles communications between mobile terminals, known as User Equipment (UEs) in LTE, and the core network, known as the Evolved Packet Core (EPC) in LTE.

The E-UTRAN consists of a network of base stations known as evolved Node Bs (eNBs), labeled eNB1 20 and eNB2 30 in FIG. 1. Each eNB is a base station that serves and controls UEs in one or more cells. In FIG. 1, eNB1 is the serving eNB for the cell 25 and the UE 10, while eNB2 is the serving eNB for the cell 35. The eNBs can communicate with each other over an optional X2 interface, to the Evolved Packet Core (EPC) via the S1 interface, and to the UEs over the radio interface. The Evolved Packet Core (EPC) includes a Mobility Management Entity (MME) 40, as well as a Serving GateWay (S-GW) 50 and Packet data network GateWay (P-GW) 60. The MME 40 handles high-level issues such as security, while the S-GW 50 and P-GW 60 are generally responsible for data traffic, including data to or from external networks.

In embodiments, the mobile terminal (UE) can exist in one of two communication states in LTE: an IDLE state in which the mobile terminal is basically on standby, and a CONNECTED state in which the mobile terminal has an active radio link to the base station. In order to improve the robustness of the terminal CONNECTED state, the LTE system prescribes a mobility mechanism known as Re-establishment. Re-establishment is designed to maintain the CONNECTED state, and to avoid unintended returns to the IDLE state. Re-establishment is used to recover from several error situations in which the network was unable to deal with the mobility of the UE. Re-establishment allows a mobile terminal that has unintentionally lost its radio link with a serving base station to reconnect to a potential new base station (often referred to as the target base station). This is in contrast to the handover mechanism in LTE whereby the network instructs the UE to disconnect from the serving base station and re-connect with another base station.

In the current LTE standard, a UE experiencing a Radio Link Failure (RLF) may need to execute certain steps before being able to access a cell with which to perform re-establishment. These steps may include performing a cell search and reading required system information. It is important that the UE accesses a new cell as soon as possible, since the time the UE spends before sending the re-establishment message directly contributes to the service interruption the user will experience. In accordance with an embodiment of the present disclosure, it would be beneficial to reduce the cell search time and reduce or omit the time needed for reading timing and system information from a new cell or cells.

When a UE experiences a Radio Link Failure (RLF), the UE operating in LTE will perform cell selection in accordance with a cell selection process as a first stage in re-establishing the connection. The UE can use one of the following two cell selection procedures:

a) Initial Cell Selection

This procedure requires no prior knowledge of which RF channels are E-UTRAN carriers. The UE may scan all RF channels in the E-UTRAN bands according to its capabilities to find a suitable cell. On each carrier frequency, the UE need only search for the strongest cell. Once a suitable cell is found this cell can be selected.

b) Stored Information Cell Selection

This procedure requires stored information of carrier frequencies and optionally also information on cell parameters from previously received measurement control information elements or from previously detected cells. Once the UE has found a suitable cell, the UE can select it. If no suitable cell is found, the Initial Cell Selection procedure can be started.

After the UE has selected a cell, the UE will have to check whether it has valid System Information for this cell (e.g., by checking the SIB1 value tag). If the information the UE has stored is outdated, the UE will have to acquire the updated System Information before starting the re-establishment signaling to the new cell.

Because of the importance of connecting quickly to a new cell after a radio link failure, a UE operating in LTE will be required to connect within certain time limits. The UE re-establishment delay (TUE-re-establish_delay) requirement can be expressed by the following equation (source: 3GPP TS 36.133 section 6.1.2.1):

$$\text{TUE-re-establish\_delay} < 50 \text{ ms} + N\text{freq} * T\text{search} + \text{TSI} + \text{TPRACH}$$

where, Tsearch is the time required by the UE to search for a target cell.

Tsearch is 100 ms if the target cell is known by the UE; the target cell is known if it has been measured by the UE in the last 5 seconds.

Tsearch is 800 ms if the target cell is unknown by the UE; the target cell is unknown if it has not been measured by the UE in the last 5 seconds.

TSI is the time required for receiving all the relevant system information according to the reception procedure and the RRC procedure delay for receiving all relevant system information blocks for the target cell.

TPRACH is the additional delay caused by the random access procedure; it will be at least 10 ms due to random access occasion and there might be additional delay due to ramping procedure.

Nfreq is the total number of E-UTRAN frequencies to be monitored for RRC re-establishment; Nfreq=1 if the target cell is known.

Figure 2:
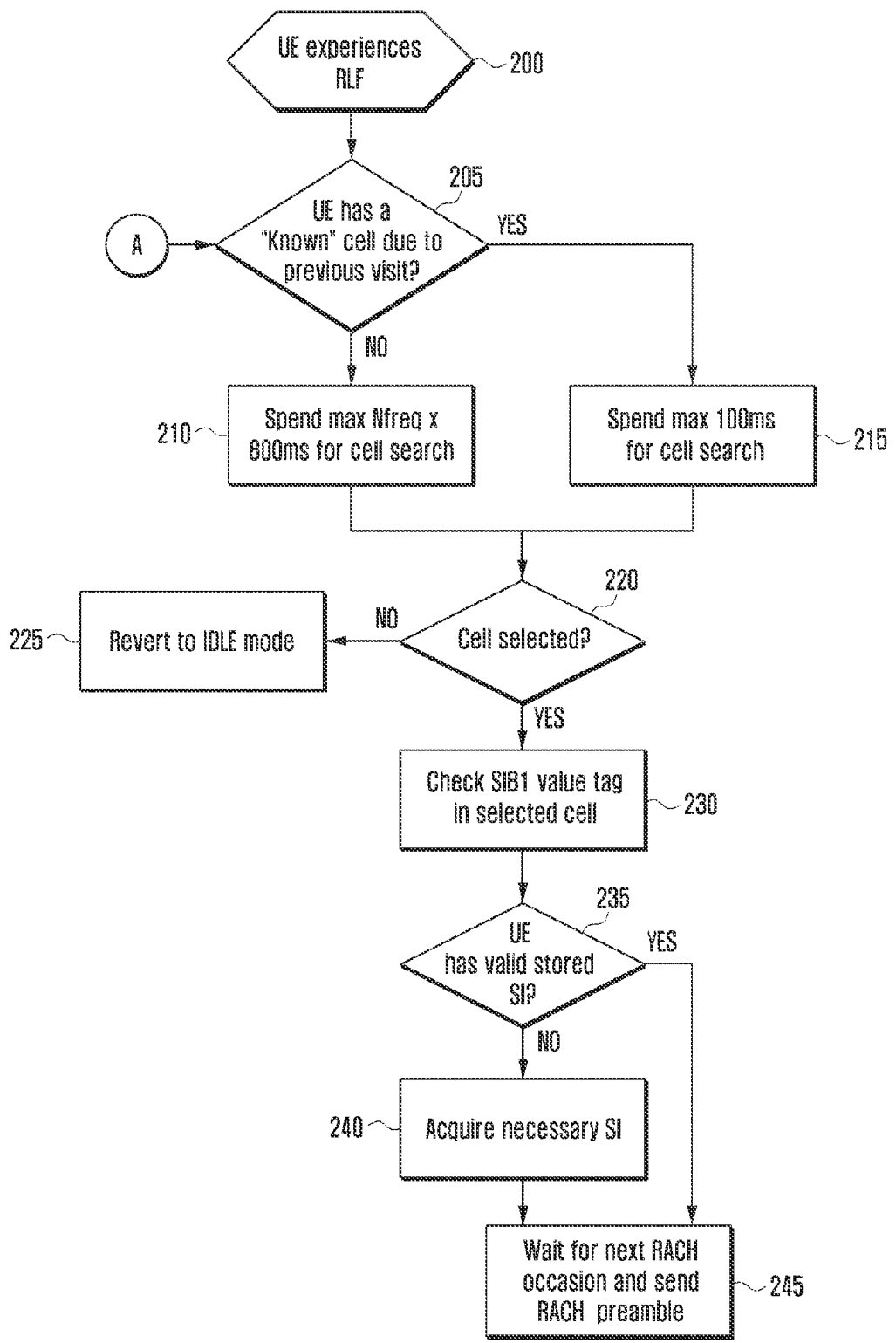
FIG. 2 is a flowchart illustrating steps performed by a mobile terminal following a radio link failure in connected mode according to an embodiment of the present disclosure.

FIG. 2 is a flowchart illustrating steps performed by a mobile terminal following a radio link failure in connected mode according to an embodiment of the present disclosure.

Referring to FIG. 2, the radio link failure itself is shown at operation 200. After the RLF has been detected, the UE checks at operation 205 to see if it has information on an earlier visited cell, and whether the information is current (i.e., the timing information is up to date). If a "known" cell is present, the UE spends a maximum of 100 ms searching for the cell based on the information stored in the UE at operation 215. If no known cell is present, then the UE at operation 210 is permitted a maximum of 800 ms times the Number of frequencies (Nfreq) to perform a search for a new cell. If neither of these cell searches finds a suitable cell at operation 220 then the UE reverts to IDLE mode at operation 225. If a suitable cell is selected at operation 220 then the UE reads the SIB1 value tag for the cell at operation 230. If the UE has system information for the selected cell and the SIB1 value tags match then the system information is assumed to be valid at operation 235. If no system information is stored in the UE, or if the system information is not valid, then the UE acquires the necessary system information at operation 240. In the final operation 245, the UE waits until the next random access occasion and sends a RACH preamble to begin re-establishment with the newly selected cell.

There are a number of drawbacks that can be identified if the re-establishment procedure relies solely on the mobile terminal for finding new cells after a radio link failure, or relying on cells that the mobile terminal happens to have recently visited. These include:

1) Low Network Control

It has been observed that the network has very little control on the cell that the UE will attempt to camp on (i.e., consider "suitable"), or on the frequency that the UE will search. For example, the UE might attempt to find cells or use frequencies which actually do not have coverage in the location of the UE. This increases the likely delay experienced by the UE until successful re-establishment.

In addition, the network will have more problems to ensure that the cell selected by the UE is "prepared" (i.e., has UE context) so that the re-establishment can succeed.

2) Large Search Delay

If the target cell is not yet known to the UE, or has not been measured during the last 5 s, a relatively large search time per frequency would be required.

3) System Information Reading Delay

The UE will have to check whether it has valid System Information (SI) for any cell found after radio link failure. If it does have stored System Information associated with a known cell, the UE cannot immediately start the random access procedure with the cell until it has checked the System Information is valid (by checking the SIB1 value tag first). If it does not have valid System Information, the UE will have to acquire the necessary System Information from the cell before starting the random access procedure and initiating the re-establishment signaling.

If a UE has stored information from a previously visited cell, then when it experiences a radio link failure, the UE may apply the "Stored Cell Information Selection" procedure above to find a suitable cell to re-establish a connection with. This would involve checking if the previous cell is still available and then use that cell for the re-establishment. If the previous cell is indeed available and the UE has measured on it during the last 5 s, Tsearch will be 100 ms instead of 800 ms. In addition, if the UE has stored the system information from the previous cell and finds out (e.g., when reading the value tag in SIB1 in the previous cell) that nothing relevant has changed in the previous cell, it may also avoid the delay in acquiring System Information from the previous cell.

However, relying on cell information from previously visited cells is not optimal since there is little network control of what cells the UE would have visited, and there may be little correlation between suitable cells for re-establishment and the previously visited cells of the UE. Furthermore, even if the previously visited cell is a cell suitable for re-establishment (and the UE has stored information about the cell), the UE would still need to check the value tag in SIB1 when acquiring the cell to see if the stored information is still valid. This can take up to 120 ms. Then, if the SI changed, the UE would have to acquire the updated SI which can take up to 1280 ms.

Accordingly, the following sections describe enhancements designed to improve the chances of re-establishing a connection with a new cell following a radio link failure. These enhancements include procedures which aim to improve the chances of identifying a suitable cell quickly, and where appropriate, to provide cascading procedures for finding or connecting with suitable re-establishment cells. The processes below can be performed by dedicated signaling or broadcast signaling from the network to the mobile terminal Signaling can come from the serving cell to the mobile terminal.

Fallback Cell

In this approach, the network is arranged to configure a fallback cell which the mobile terminal can connect to after a radio link failure.

The network could, for example, configure the fallback cell when the UE is connected in a pico cell. Because of their size, pico cells tend to experience relatively frequent radio link failures with UEs. In such a situation, an overlapping macro cell might be configured as the fallback cell since the macro cell may be the most reliable cell for the UE to fallback to due to the overlapping coverage area of the cells. In a case in which a pico cell is overlapped by multiple macro cells, more than one fallback cell may be configured.

After the UE is informed of the fallback cell it should use in case of RLF, the UE may wish to ensure that the fallback cell is known with respect to a cell search that may be required in the event of a radio link failure. A cell may be known by the UE if the UE knows the detailed timing of the cell. This timing can be communicated to the UE from the serving cell at the same time as communicating the identification of the fallback cell. Alternatively, the UE can measure the timing by listening to the fallback cell after it is identified by the serving cell. Knowing the timing of the fallback cell has the benefit of reducing cell search time. It is also beneficial to keep the known information (e.g. timing information) of the fallback cell current or valid by updating it periodically. Accordingly, the UE can measure on the fallback cells at least every 5 s.

Figure 3:
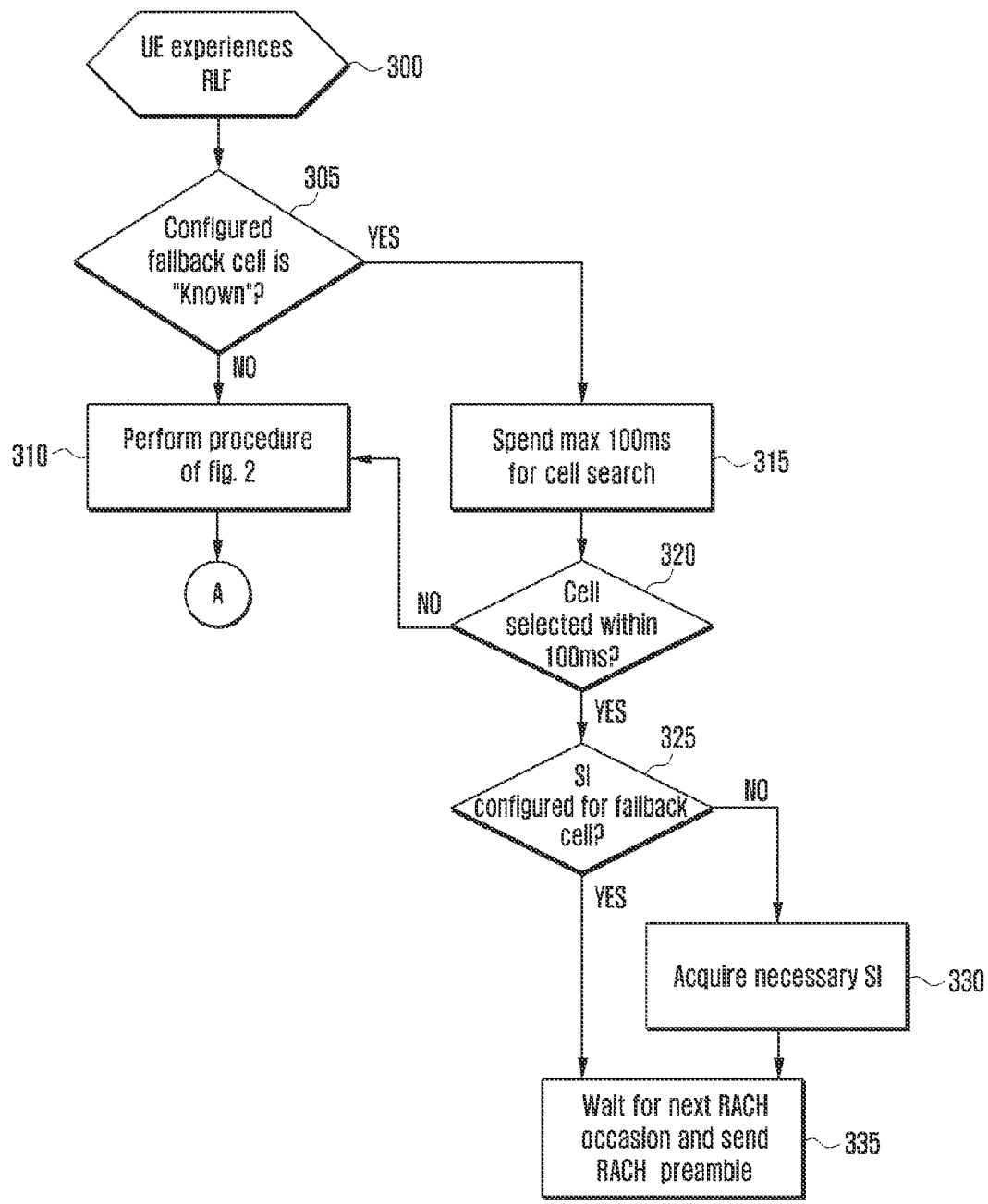
FIG. 3 is a flowchart illustrating steps performed in a mobile terminal if a fallback cell is configured by a network according to an embodiment of the present disclosure.

FIG. 3 is a flowchart illustrating steps performed in a mobile terminal if a fallback cell is configured by a network according to an embodiment of the present disclosure.

Referring to FIG. 3, the UE experiences radio link failure at operation 300. At operation 305, the UE checks to see if it has fallback cell configured, i.e., "known." If not, the re-establishment procedure continues as in FIG. 2, as shown by operation 310 and label A. If the fallback cell is configured in the UE, then the UE proceeds to search for the configured fallback cell at operation 315. Since the cell is known, preferably with timing information, then the step of searching for (and acquiring) the cell can be performed relatively quickly. Hence, the maximum time to search for the fallback cell is set as 100 ms. If the UE is not able to find the fallback cell in this time period at operation 320 then the UE assumes that a connection with the fallback cell is not possible and reverts to the procedure of FIG. 2 at operation 310. On the other hand, if the fallback cell is found, then the UE checks to see if the system information for the fallback cell is also configured at operation 325. If not, the UE acquires the system information at operation 330. Finally, the UE waits for the next random access occasion, and send the RACH preamble message to the selected cell at operation 335.

When a radio link failure occurs, the UE should first attempt to perform re-establishment on the configured fallback cell or cells. If more than one fallback cell is configured, the network can specify the order in which the UE may attempt to find the different fallback cells. If the UE is not able to find any of the fallback cells, it may revert to normal search procedures as shown in the procedure of FIG. 2.

The fallback information can also be used after the re-establishment is rejected. Rejection may occur, for example, if the selected or target cell cannot accept a re-establishment request due to missing UE context information in the target base station (eNB). If rejection occurs, then the UE reverts to IDLE mode, in which case the fallback information can be used to find a suitable cell faster.

If the fallback cell is no longer accessible, the process reverts to the procedure in FIG. 2. However, an additional delay may be caused by looking for the fallback cell compared to using the procedure from FIG. 2 directly. It could be useful to limit this time by setting appropriate maximum periods for performing different steps in the procedure. These periods can be optimized to try to minimize the chances of the UE reverting to the IDLE mode.

For example, it may be possible to specify a maximum time that the UE is allowed to spend before transmitting a RACH preamble in a fallback cell, thus limiting the service interruption that the user will experience in case re-establishment on a fallback cell is not possible.

For example, it may be possible to specify the maximum time the UE is allowed to spend on searching for fallback cells before reverting to the procedure of FIG. 2, since, if the fallback cell has not been found within a certain period, then it may be assumed that the fallback cell is unlikely to be found.

The ability for the network to configure a fallback cell has a number of benefits. For example, since the network configures the fallback cell or cells, it may control what cell or cells are attempted first by the UE after RLF, thus enabling the network to take the deployment situation into account and avoiding useless search attempts by the UE.

Having increased network control also makes it easier for the serving eNB to ensure that the relevant eNBs (i.e., to which the fallback cells belong) are prepared with a proper UE context.

Since the UE can be configured to always maintain the fallback cell as up to date and known by the UE, when the RLF occurs, even if the UE has never camped on the cell before or the cell was not in the "stored information", the search time for the fallback cell can be decreased.

Using the exemplary maximum times, compared to the situation in which the UE did not measure on the concerning cell in the last 5 s, there is a decrease in search time from 800 ms to 100 ms.

Fallback Frequency

In this approach, a fallback frequency or a set of fallback frequencies is configured by the network for use by the mobile terminal in preparation for a radio link failure.

In the fallback frequency approach, the network may not specify any priority order for any cell on the indicated frequency, nor direct the UE to any cell on that frequency. Instead, the UE is free to find the best cell on the indicated fallback frequency, to try to keep that cell "known," and may access that cell in the event of a radio link failure.

When a fallback frequency is configured, the UE may be required at all times to try to have a "known" best cell on that frequency with respect to a cell search. This might require the UE to measure on the identified best cell at least every 5 s.

In the event of a radio link failure, the UE may first attempt to perform re-establishment on the known best cell on that configured fallback frequency. Alternatively, if no best cell has been identified prior to the radio link failure, the UE may search for a cell on the fallback frequency after radio link failure has occurred i.e., during the cell selection stage.

If the UE is not able to find any suitable cell on the fallback frequency, it can revert to the procedure illustrated in FIG. 2.

Figure 4:
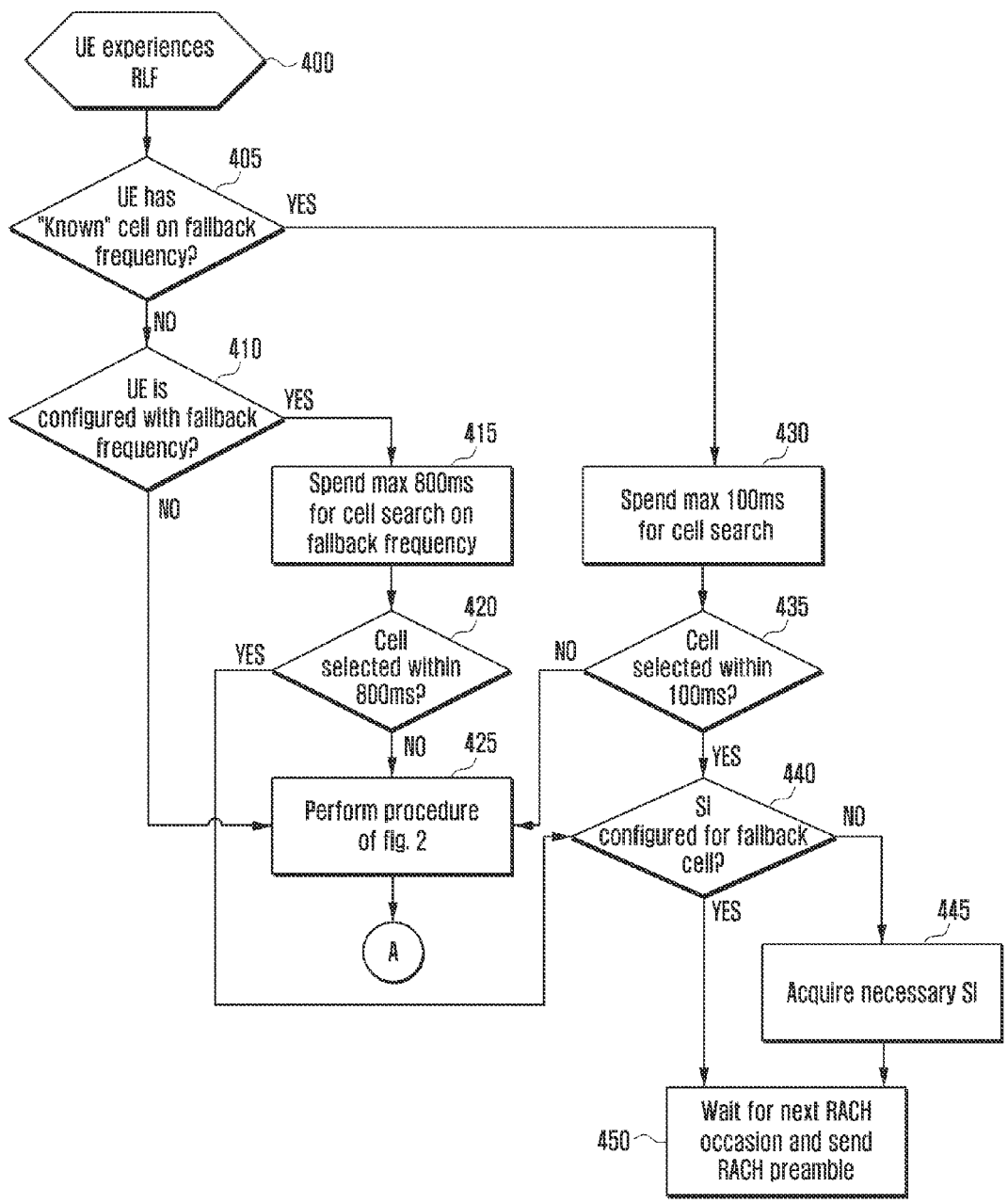
FIG. 4 is a flowchart illustrating steps performed in a mobile terminal if a fallback frequency is configured by a network according to an embodiment of the present disclosure.

FIG. 4 is a flowchart illustrating steps performed in a mobile terminal if a fallback frequency is configured by the network according to an embodiment of the present disclosure.

Referring to FIG. 4, the UE experiences the radio link failure at operation 400. At operation 405, the UE checks to see if it has previously selected a "known" cell on a fallback frequency. If not, the re-establishment procedure determines if the UE is configured with the fallback frequency at operation 410. If the fallback cell is configured in the UE, then the UE proceeds to search for the configured fallback cell in step at operation 415. Since the cell is known, preferably with timing information, then the step of searching for (and acquiring) the cell can be performed relatively quickly. Hence, the maximum time to search for the fallback cell is set as 100 ms. If the UE is not able to find the fallback cell in this time period at operation 420, then the UE assumes that a connection with the fallback cell is not possible and reverts to the procedure of Figure FIG. 2 at operation 425. Likewise, if the UE is not configured with the fallback frequency at operation 410, the procedure continues as in FIG. 2, as shown by operation 425 and label A. If the fallback cell is configured in the UE, then the UE proceeds to search for the configured fallback cell at operation 430. Since the cell is known, preferably with timing information, the step of searching for and acquiring the cell can be performed relatively quickly. Hence, the maximum time to search for the fallback cell is set as 100 ms. If the UE is not able to find the fallback cell in this time period at operation 435 then the UE assumes that a connection with the fallback cell is not possible and reverts to the procedure of FIG. 2 at operation 425. On the other hand, if the fallback cell is found then the UE checks to see if the system information for the fallback cell is also configured at operation 440. If not, the UE acquires the system information at operation 445. Finally, the UE waits for the next random access occasion, and send the RACH preamble message to the selected cell at operation 450. In case the fallback frequency is configured but a suitable cell was not selected prior to the radio link failure, then the flowchart proceeds to operation 415 where the UE spends 800 ms searching for a suitable cell only in the fallback frequency. If a suitable cell is found, preferably satisfying quality criteria, then the procedure moves to operation 440 to check if the UE has system information for the fallback cell as described above.

The fallback information can also be used in the event that re-establishment is rejected (e.g. due to a missing UE context in target eNB) to find a suitable cell in IDLE faster.

In an embodiment, if a suitable cell is no longer accessible, the process reverts to the procedure in FIG. 2. However, an additional delay may be caused by looking for the previously identified suitable cell compared to using the procedure from FIG. 2 directly. It may be useful to limit this time by setting appropriate maximum periods for performing different steps in the procedure. These periods can be optimized to try to minimize the chances of the UE reverting to the IDLE mode.

For example, it may be possible to specify a maximum time that the UE is allowed to spend before transmitting a RACH preamble in a previously identified suitable cell, thus limiting the service interruption that the user will experience in case re-establishment on a suitable cell is not possible.

In an embodiment, it may be possible to specify the maximum time the UE is allowed to spend on searching for a previously identified suitable cell before reverting to the procedure of FIG. 2, since, if the cell has not been found within a certain period, then it may be assumed that the cell is unlikely to be found.

In case the mobile terminal has been configured with a fallback frequency but no cell has been identified before a radio link failure, it may be possible to specify a maximum time the UE is allowed to spend on searching for a suitable cell on the fallback frequency, thus limiting the service interruption the user will experience if the UE needs to revert to alternative procedures (such as FIG. 2).

Since the network configures the fallback frequency, this approach has the benefit of being able to control of what frequency is attempted first by the UE in the event of a radio link failure. Thus, the network is able to take the network deployment situation into account and avoid useless search attempts by the UE.

This increased network control will also make it easier for the serving eNB to ensure that the relevant eNBs associated with the fallback frequency are prepared with a UE context.

If the fallback frequency approach is successful, then the following maximum delays may be experience by the mobile station:

If a suitable cell has been identified before RLF: 100 ms cell search time plus 50 ms=150 ms If no suitable cell has been identified before RLF: 800 ms cell search time on the fallback frequency plus 50 ms=850 ms.

Fallback Preparation Indication

In this approach, the network configures the UE with a warning indication that it is preferable to prepare for a re-establishment by having a fallback cell prepared and "known." This way, the service interruptions in the event of radio link failure can be minimized:

The network can configure a fallback preparation indication using broadcast or dedicated signaling to the mobile station. Once configured, the UE may try to prepare a fallback cell, that is, a cell that is "known" from cell search point of view. The determination of the fallback cell is not limited to any specific frequency or cell.

In the event of a radio link failure, the UE may first attempt to perform re-establishment on the prepared fallback cell. If the UE is not able select the prepared fallback cell, it may revert to alternative cell search procedures (such as FIG. 2).

Figure 5:
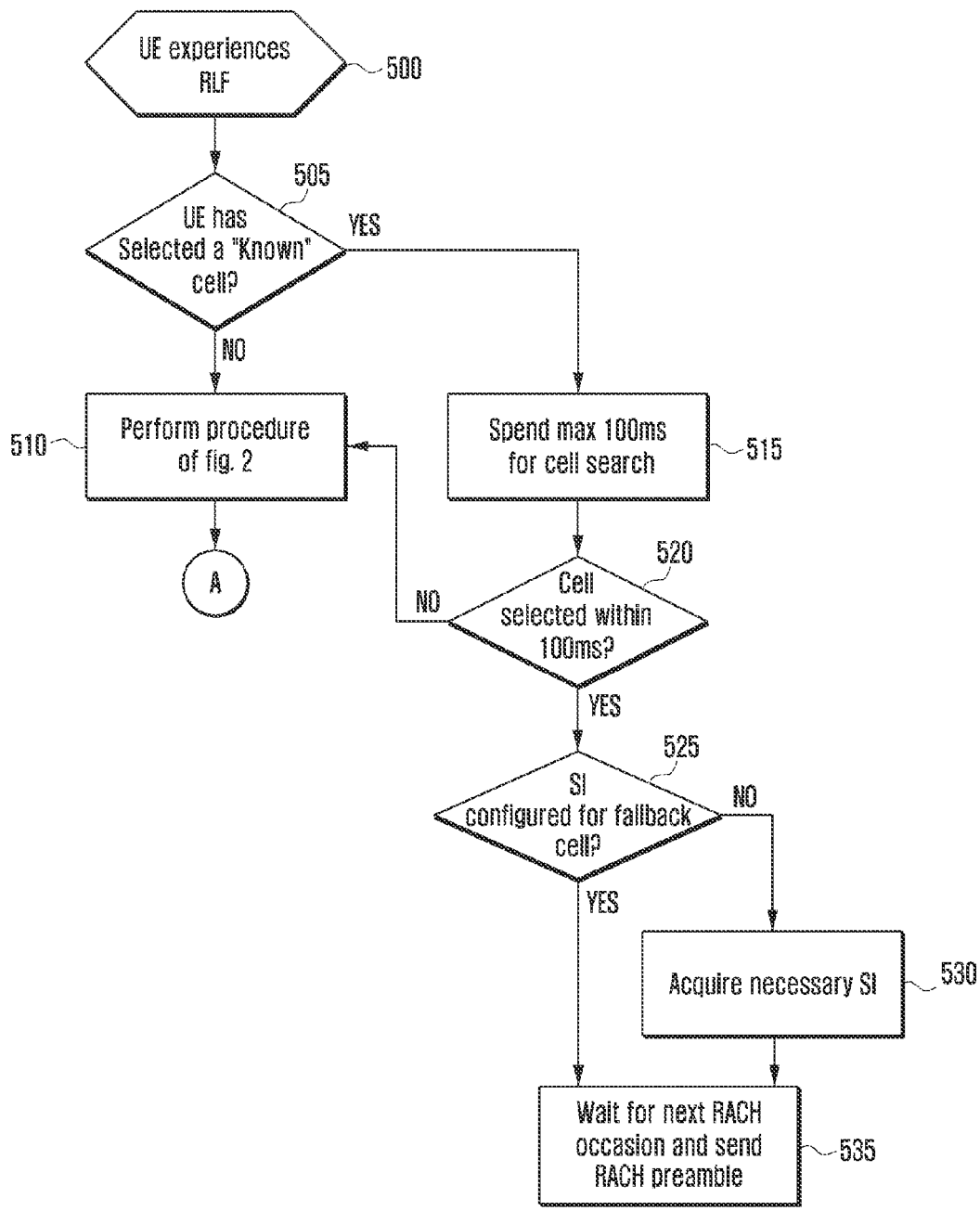
FIG. 5 is a flowchart illustrating steps performed in a mobile terminal if a fallback preparation indication is configured by a network according to an embodiment of the present disclosure.

FIG. 5 is a flowchart illustrating steps performed in a mobile terminal if a fallback preparation indication is configured by the network according to an embodiment of the present disclosure.

Referring to FIG. 5, the UE experiences the radio link failure at operation 500. At operation 505, the UE checks to see if it has previously selected a "known" cell following reception of the fallback preparation indication. If not, the procedure continues as in FIG. 2, as shown by operation 510 and label A. If the fallback cell is configured in the UE then the UE proceeds to search for the configured fallback cell at operation 515. Since the cell is known, preferably with timing information, the step of searching for and acquiring the cell can be performed relatively quickly. Hence, the maximum time to search for the fallback cell is set as 100 ms. If the UE is not able to find the fallback cell in this time period at operation 520 then the UE assumes that a connection with the fallback cell is not possible and reverts to the procedure of FIG. 2 at operation 510. On the other hand, if the fallback cell is found then the UE checks to see if the system information for the fallback cell is also configured at operation 525. If not, the UE acquires the system information at operation 530. Finally, the UE waits for the next random access occasion, and sends the RACH preamble message to the selected cell at operation 535.

In a variation of this approach, the configured UE may limit the search for a suitable fallback cell in frequencies other than the frequency of the serving cell.

In other words, the fallback cell may be found using an inter-frequency search rather than an intra-frequency search.

Autonomous Leave of Serving Cell

A UE may require measurement gaps to be configured in the connection with the serving cell to measure on an inter-frequency carrier. These measurement gaps are configured under network control. If the network does not configure the measurement gaps, inter-frequency measurements are normally not permitted.

In the fallback cell, fallback frequency or fallback preparation indication approaches discussed, it may be beneficial to allow inter-frequency measurements to occur before any radio link failure, i.e., while the UE is still connected in the serving cell. Thus, in accordance with an embodiment of the present disclosure, the UE may be allowed to autonomously leave the serving cell for some limited period and to perform measurements to ensure that an identified cell is kept up to date, before returning to the serving cell.

In this case, the introduced loss or interruption on the serving cells should be limited such that it does not result in an unacceptable service interruption. In an embodiment, the mobile terminal may be configured with a maximum "go away time."

For example, the mobile terminal may be configured with a maximum loss rate that may occur in the serving cell due to the UE being absent in the serving cells.

The permission for the UE to cause this extra loss may be limited to specific conditions, for example, only when the serving cell quality goes below a threshold level.

By allowing the UE to autonomously leave the serving cell for a short period, the UE is able to make inter-frequency measurements when needed to speed up a possible re-establishment, even if no measurement gaps are configured by the network.

System Information Provisioning

When re-establishment occurs, the UE has to ensure it has up to date relevant System Information (SI) for the new cell. The system information may be used, for example, to configure the timing of a random access preamble transmitted from the UE to the base station. Because the system information is acquired in a series of blocks, it may take some time for the UE to acquire all relevant system information. In order to avoid this SI-reading delay, the network could provide the UE with relevant SI for one or more cells (preferably cells neighboring or overlapping with the serving cell).

The network may provide the relevant SI for one or more cells to the UE, which the UE can use to reduce re-establishment delay in the event that re-establishment occurs in a cell for which the SI is provided.

The system information provided could, for example, be a subset of the total broadcast information in the fallback cell, but sufficient to start the RACH procedure immediately.

Any remaining missing system information may be obtained by the UE from the target cell during or after re-establishment.

In general, the provision of system information to the UE is intended for LTE mobility where the UE is maintained in the CONNECTED state.

Ideally, the cell or cells for which the system information (SI) is provided may be fallback cell or cells, or cells on the fallback frequency as previously discussed.

The SI provided to the UE may be updated by the serving base station at regular intervals so that it is always up to date. By remaining up to date, the UE does not need to check the value tag broadcast by the serving cell since it knows that the system information is current. In this way, it is possible to gain between 20 and 100 ms from the re-establishment delay, even compared to the situation in which the UE would have already obtained system information for the concerned cell by other means.

Compared to the case in which the UE did not obtain up to date System Information yet by other means, we gain the full System Information reading time (potentially up to 1280 ms, for example).

Additional Configuration Information

In a network deployment including pico cells with overlapping macro cells, it will probably not always be the case that System Frame Number (SFN)/radio frame/subframe timing exists between the macro and the pico cell. This may be due to a lack of a suitable interface being available, or if no GPS capability exists in the cells, for example. However, cell search performance will improve if the UE knows that a neighboring or overlapping cell is synchronized with a current cell. This is relevant to whether the UE is in CONNECTED mode or in IDLE mode.

The serving eNB may inform the UE whether or not a cell to measure on (or all cells on a frequency to measure on) is synchronized to the currently serving cell with respect to a number of timing parameters. These timing parameters may include one or more of the following: subframe timing, radio frame timing, and/or SFN timing.

This information about the relative synchronization between a serving cell and a cell to measure on is especially beneficial in the situation that the cell being measured is a fallback cell as previously discussed. Synchronization information about a number of cells on a particular frequency relative to the serving cell is also beneficial for the fallback frequency approach previously discussed.

A benefit of knowing about the synchronization is that it enables faster cell search in the event that the serving cell and the target cell are known to be synchronized.

Preparation for Re-Establishment Only

In certain cases a source eNB might only want to prepare a target eNB for potential re-establishment in one of the cells of the target eNB. This might, for example, be the case when the UE is in a pico cell, no handover is yet intended but the eNB wants to protect the UE against re-establishment failure when the UE may experience a Radio Link Failure in the future and attempt re-establishment in a covering macro cell. In such a situation, it might be useful to prepare macro cell although no handover is intended.

In such a situation, the prepared cell/eNB might stay "prepared" for a longer time than might be the case for a handover. This may occur when the UE does not move but stops in the pico cell.

A target eNB preparation procedure is proposed which is only intended for enabling a re-establishment. Such a procedure may specifically avoid reserving connection resources in the target eNB, as may occur in a handover request.

From a signaling point of view, this type of functionality may be introduced by a suitable procedure over the X2 interface between eNBs, or be introduced via the S1 interface.

In an embodiment, the network mobility procedures may enable both a re-establishment preparation and a handover preparation. Both the re-establishment preparation and handover preparation procedures may be initiated from the source eNB to a suitable target eNB. The two preparation messages can be formatted in much the same way but with an indicator to show notify the target eNB that the message is a re-establishment preparation message rather than a handover message. The indicator can be implemented as a 1 bit flag in the preparation message.

The target eNB would be configured to recognize the two different preparation messages, and would reserve connection resources in the case of a handover preparation message, but would avoid reserving resources in the case of the re-establishment message.

Figure 6A:
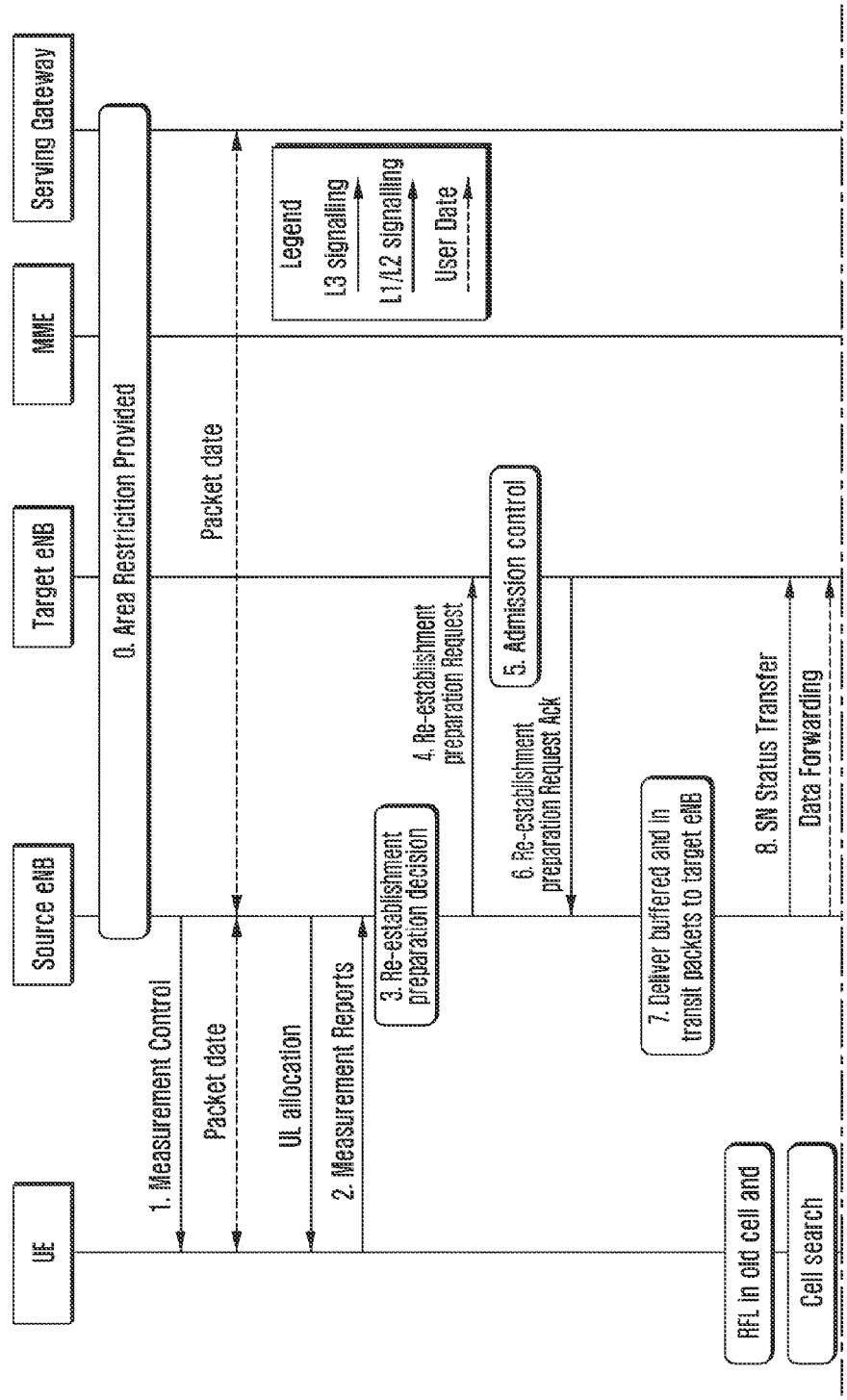
FIGS. 6A and 6B illustrate a messaging protocol for re-establishment preparation between a source evolved Node B (eNB) and a target eNB according to an embodiment of the present disclosure.
Figure 6B:
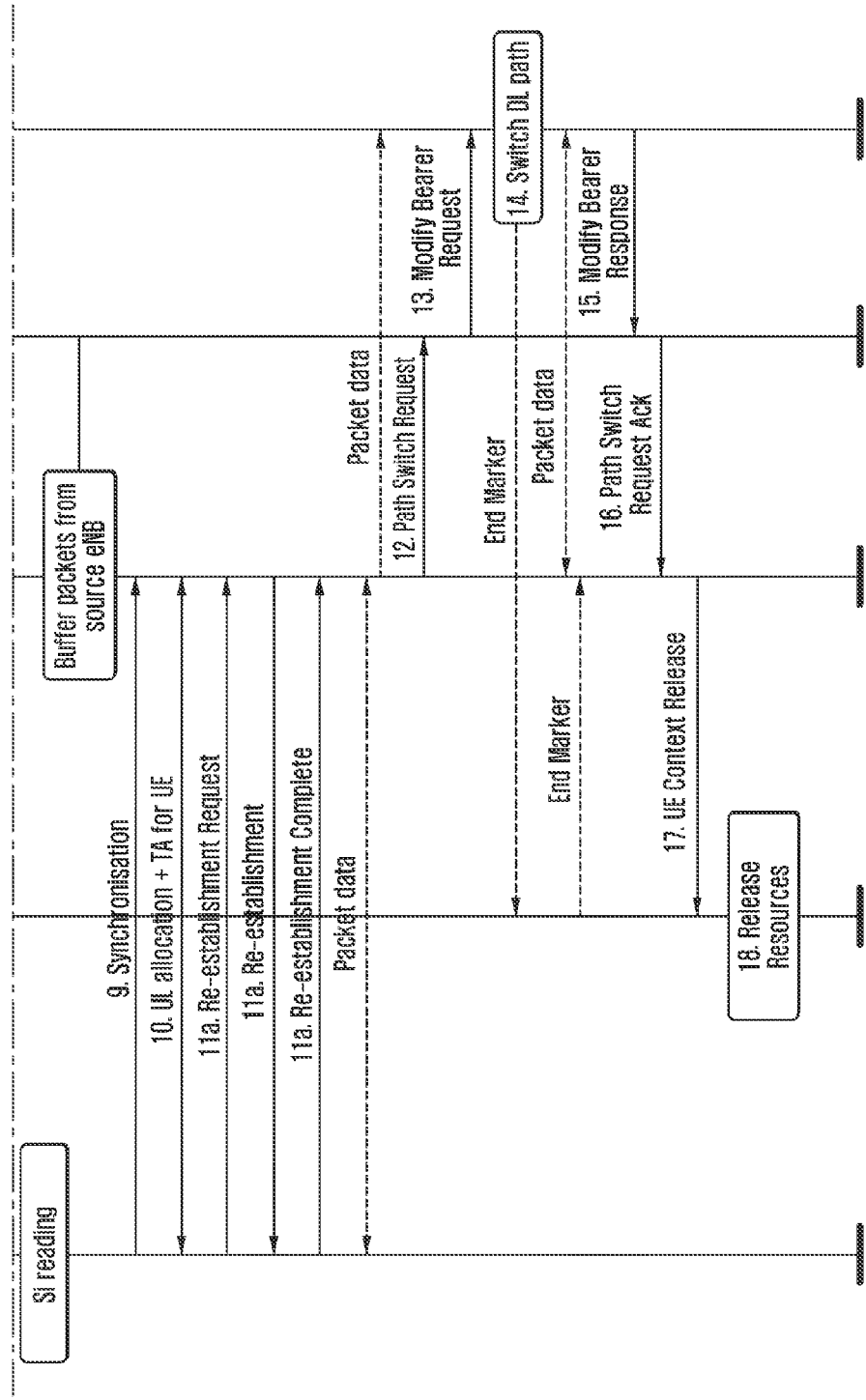

FIGS. 6A and 6B illustrate a messaging protocol for re-establishment preparation between a source eNB and a target eNB according to an embodiment of the present disclosure.

Referring to FIGS. 6A and 6B, the source eNB recognizes through measurement reports at operation 2 that it may be appropriate to prepare a target eNB for a possible re-establishment of the UE. At operation 3, the source eNB makes a decision to prepare for re-establishment, and sends the re-establishment preparation request message to the target eNB using level 3 signaling on the X2 interface in operation 4. In response, at operation 5, the target eNB stores the relevant UE context information in the message (i.e., Admission control) in preparation for a possible re-establishment preparation message from the UE after the UE experiences a radio link failure with the source eNB. Unlike in a handover situation, the target eNB does not reserve any connection resources for the UE. The target eNB acknowledges the request to the source eNB at operation 6. However, unlike in a handover situation, the source eNB does not command the UE to release the connection with the source eNB.

A target eNB can be prepared for potential re-establishment in one or more of the cells of the target eNB using a single preparation message.

At operation 7, the source eNB delivers buffered and in transit packets to the target eNB. The UE experiences a radio link failure with the old cell and searches for a suitable cell. At operation 8, the source eNB transfers SN status and forwards data to the target eNB. The UE reads system information and the target eNB buffers the received packets from the source eNB. At operation 9, the UE synchronizes to the target eNB. At operation 10, the target eNB sends uplink allocation and TA for the UE to the UE. At operation 11a, the UE sends a re-establishment request message to the target eNB. In response, the target eNB sends a re-establishment response message to the UE, and the UE sends a re-establishment complete message to the target eNB. At operation 12, the target eNB sends a path switch request message to the MME, and the MME sends a modify bearer request message to the Serving Gateway at operation 13. In response, at operation 14, the Serving Gateway switches downlink path and sends an end marker to the source eNB. At operation 15, the Serving Gateway sends a modify bearer response message to the MME. At operation 16, the MME sends path switch request ACK message to the target eNB, and, at operation 17, the target eNB sends a UE context release message to the source eNB. In response, at operation 18, the source eNB releases resources.

Using this process, it is possible to avoid unnecessary resource reservations in a target eNB, but to still prepare the target eNB for a re-establishment.

Since a lower layer configuration will not be used directly by target eNB for delta signaling (i.e., no delta signaling for lower layer configuration at re-establishment), the source eNB does not need to keep these configuration parts up to date. This will reduce the need to frequently update the context while the UE remains in the source eNB.

As discussed, the preparation for a re-establishment function according to an embodiment of the present disclosure can be implemented using a similar message format to a handover preparation, but with a suitable flag to indicate the different purpose of the message.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing re-establishment of a connection by a terminal in a wireless communications network, the method comprising:
   connecting with a serving cell to establish a radio link;
   receiving, from the serving cell, a message including information for a fallback cell;
   identifying the fallback cell based on the received information for the fallback cell, if a radio link failure on the serving cell is detected;
   determining the identified fallback cell as a target cell to re-establish the connection; and
   attempting to re-establish the connection to the target cell.

2. The method of claim 1,
   wherein the information for the fallback cell includes an identifier of the fallback cell, and wherein the identified fallback cell is determined as the target cell using the identifier of the fallback cell.

3. The method of claim 1, further comprising, if the re-establishment of the connection to the identified fallback cell fails, attempting to re-establish a connection to another cell which is not identified in the information.

4. The method of claim 3, further comprising:
reverting, if the re-establishment of the connection to the identified fallback cell fails, to an idle mode; and
establishing a new connection to a network including the identified fallback cell using the information for the fallback cell.

5. The method of claim 1,
wherein the information for the fallback cell includes the fallback frequency, and
wherein the identified fallback cell is determined as the target cell using the fallback frequency.

6. The method of claim 1,
wherein the information for the fallback cell includes an indication indicating to select a different cell before the radio link failure is detected, and
wherein the identified fallback cell is selected by the terminal before the radio link failure is detected.

7. A method for performing re-establishment of a connection by a base station in a wireless communications network, the method comprising:
connecting with a terminal to establish a radio link transmitting data via a serving cell; and
transmitting, to the terminal, a message including information for a fallback cell,
wherein the transmitted information for the fallback cell is used, by the terminal, to identify the fallback cell, if a radio link failure on the serving cell is detected, and
wherein the identified fallback cell is determined as a target cell to re-establish the connection.

8. The method of claim 7, wherein the information for the fallback cell includes an identifier of the fallback cell.

9. The method of claim 7, wherein the information for the fallback cell includes a fallback frequency.

10. The method of claim 7, wherein the information for the fallback cell includes an indication indicating to select a different cell before the radio link failure is detected.

11. A terminal for performing re-establishment of a connection in a wireless communications network, the terminal comprising:
a transceiver configured to transmit and receive a signal; and
a controller configured to:
connect with a serving cell to establish a radio link, to receive, from the serving cell, a message including information for a fallback cell,
identify the fallback cell based on the received information for the fallback cell, if a radio link failure on the serving cell is detected, to determine the identified fallback cell as a target cell to re-establish the connection, and
attempt to re-establish the connection to the target cell.

12. The terminal of claim 11,
wherein the information for the fallback cell includes an identifier of the fallback cell, and
wherein the identified fallback cell is determined as the target cell using the identifier of the fallback cell.

13. The terminal of claim 11, wherein the controller is further configured to attempt to re-establish a connection to another cell which is not identified in the information, if the re-establishment of the connection to the identified fallback cell fails.

14. The terminal of claim 13, wherein the controller is further configured to:
revert, if the re-establishment of the connection to the identified fallback cell fails, to an idle mode, and
establish a new connection to a network including the identified fallback cell using the information for the fallback cell.

15. The terminal of claim 11,
wherein the information for the fallback cell includes the fallback frequency, and
wherein the identified fallback cell is determined as the target cell using the fallback frequency.

16. The terminal of claim 11,
wherein the information for the fallback cell includes an indication indicating to select a different cell before the radio link failure is detected, and
wherein the identified fallback cell is selected by the terminal before the radio link failure is detected.

17. A base station for performing re-establishment of a connection in a wireless communications network, the base station comprising:
a transceiver configured to transmit and receive a signal; and
a controller configured to:
connect with a terminal to establish a radio link transmitting data via a serving cell, and
transmit, to the terminal, a message including information for a fallback cell,
wherein the transmitted information for the fallback cell is used, by the terminal, to identify the fallback cell, if a radio link failure on the serving cell is detected, and
wherein the identified fallback cell is determined as a target cell to re-establish the connection.

18. The base station of claim 17, wherein the information for the fallback cell includes an identifier of the fallback cell.

19. The base station of claim 17, wherein the information for the fallback cell includes a fallback frequency.

20. The base station of claim 17, wherein the information for the fallback cell includes an indication indicating to select a different cell before the radio link failure is detected.

* * * * *